US008947652B2

(12) United States Patent
Ohmae et al.

(10) Patent No.: US 8,947,652 B2
(45) Date of Patent: Feb. 3, 2015

(54) PHOTOELECTRIC SENSOR (71) Applicant: Omron Corporation, Kyoto (JP)

(72) Inventors: Soji Ohmae, Nara (JP); Kiyohiko Gondo, Kyoto (JP); Yusuke Iida, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 14/030,231

(22) Filed: Sep. 18, 2013

(65) Prior Publication Data

US 2014/0111814 A1    Apr. 24, 2014

(30) Foreign Application Priority Data

Oct. 23, 2012 (JP) ................. 2012-233404

(51) Int. Cl.
*G01B 11/00* (2006.01)
*G01J 1/18* (2006.01)
*G01V 8/10* (2006.01)

(52) U.S. Cl.
CPC . *G01B 11/00* (2013.01); *G01J 1/18* (2013.01); *G01V 8/10* (2013.01)
USPC .......................................... 356/213; 356/218

(58) Field of Classification Search
CPC ... G01B 11/00; G01N 21/05; G01N 21/6452; G01N 21/6456; G01N 21/6458; G01N 21/648; G01N 21/76; G01N 21/763; G01N 33/54306; G01N 33/54366; G01J 1/18; G01J 1/42; G01J 1/44
See application file for complete search history.

(56) References Cited

U.S. PATENT DOCUMENTS 6,894,662 B2    5/2005  Fukumura
6,944,359 B2    9/2005  Kamei et al.
2011/0215221 A1*  9/2011  Nakamura et al. ............ 250/206

FOREIGN PATENT DOCUMENTS

EP    2 363 735 A2    9/2011
JP    2007-093464    4/2007

OTHER PUBLICATIONS

Extended European Search Report for EP Application No. 13185888, dated Nov. 13, 2013.

* cited by examiner

*Primary Examiner* — Michael P Stafira
(74) *Attorney, Agent, or Firm* — Greenblum & Bernstein, P.L.C.

(57) ABSTRACT

The disclosure provides a photoelectric sensor that provides useful information to set measurement conditions. The photoelectric sensor includes a light emitting unit having a light emitting element configured to emit detection light toward a detection area, a light receiving unit having a light receiving element configured to receive the detection light from the detection area and to obtain a detection value corresponding to the amount of light received, and a display unit configured to display information about the detection value in the light receiving unit. When the detection value varies across a predetermined threshold, the display unit displays a transit time that is the time from when the detection value crosses the predetermined threshold until when it crosses the predetermined threshold again, and a variation amount of the detection value in the variation.

4 Claims, 10 Drawing Sheets

FIG. 6A (RESOLUTION)   (TRANSIT TIME)

"UP" OR "DOWN" SHORT PRESS

FIG. 6B (DETECTION MODE)   (AMOUNT OF LIGHT)

"MODE" SHORT PRESS

FIG. 6C (RESOLUTION)   (TRANSIT TIME)

| DETECTION FUNCTION | | RESPONSE TIME | AMOUNT OF LIGHT |
|---|---|---|---|
| HS HIGH SPEED MODE | | 250 μs | 1 (STANDARD) |
| STND STANDARD MODE | | 1ms | 1 TIMES |
| GIGA GIGA MODE | | 16ms | 12 TIMES |
| SHS SUPER HIGH MODE | NPN | 50 μs | 0.25 TIMES |
| | PNP | 50 μs | |

PHOTOELECTRIC SENSOR

CROSS REFERENCE TO RELATED APPLICATIONS

This application claims priority to Japanese Patent Application No. 2012-233404 filed on Oct. 23, 2012, the entire contents of which are incorporated by reference herein.

FIELD

Disclosed herein is a photoelectric sensor, and more particularly, a photoelectric sensor with a display.

BACKGROUND

Photoelectric sensors are widely used to detect the presence or absence of an object moving, for example, in a factory production line. Conventionally, various techniques have been proposed for such photoelectric sensors.

For example, Japanese Unexamined Patent Publication No. 2007-93464 discloses a technique that compares the amount of light received at the light receiving element of a photoelectric sensor with a threshold value, outputs an ON signal or an OFF signal, and displays information to determine the duration time of the ON signal (i.e., ON time width) and the duration time of the OFF signal (i.e., OFF time width).

The above-described display of the ON time width and the OFF time width can be a help to users when trying to set the response time of a photoelectric sensor.

However, items to be set in the photoelectric sensor are not limited to response time only. The user hopes that additional useful information is provided when setting the measurement conditions of the photoelectric sensor.

SUMMARY

The embodiment has been devised in view of these circumstances, and an object thereof is to provide useful information to set the measurement conditions of a photoelectric sensor.

In accordance with one aspect of the embodiment, a photoelectric sensor includes a light emitting unit having a light emitting element configured to emit detection light toward a detection area, a light receiving unit having a light receiving element configured to receive the detection light from the detection area and to obtain a detection value corresponding to the amount of light received, and a display unit configured to display information about the detection value in the light receiving unit. When the detection value varies across a predetermined threshold, the display unit displays a transit time that is the time from when the detection value crosses the predetermined threshold until when it crosses the predetermined threshold again, and a variation amount of the detection value in the variation.

Preferably, the photoelectric sensor further includes a setting device configured to set conditions for the detection of an object, the detection being performed using the light emitting unit and the light receiving unit. The setting device sets a response time of the detection based on the transit time and the variation amount.

Preferably, the photoelectric sensor further includes a memory device configured to store two or more response times of the detection. The memory device selects and sets one response time out of the two or more response times stored in the memory device based on the transit time and the variation amount.

Preferably, the photoelectric sensor further includes an input device configured to receive input of information. When a predetermined input to the input device is provided while the transit time and the variation amount are displayed, the display unit displays information to identify the response time selected by the setting device.

In accordance with another aspect of the embodiment, when a detection value varies across a predetermined threshold, a photoelectric sensor displays a transit time that is the time from when the detection value crosses the predetermined threshold until it crosses the predetermined threshold again, and a variation amount of the detection value in the variation, thereby providing useful information to set the measurement conditions of the photoelectric sensor.

DETAILED DESCRIPTION

Embodiments of the photoelectric sensor will now be described with reference to the drawings. The same components are denoted by the same reference numerals in the drawings, and detailed descriptions are not repeated.

A. Appearance of Photoelectric Sensor

Figure 1:
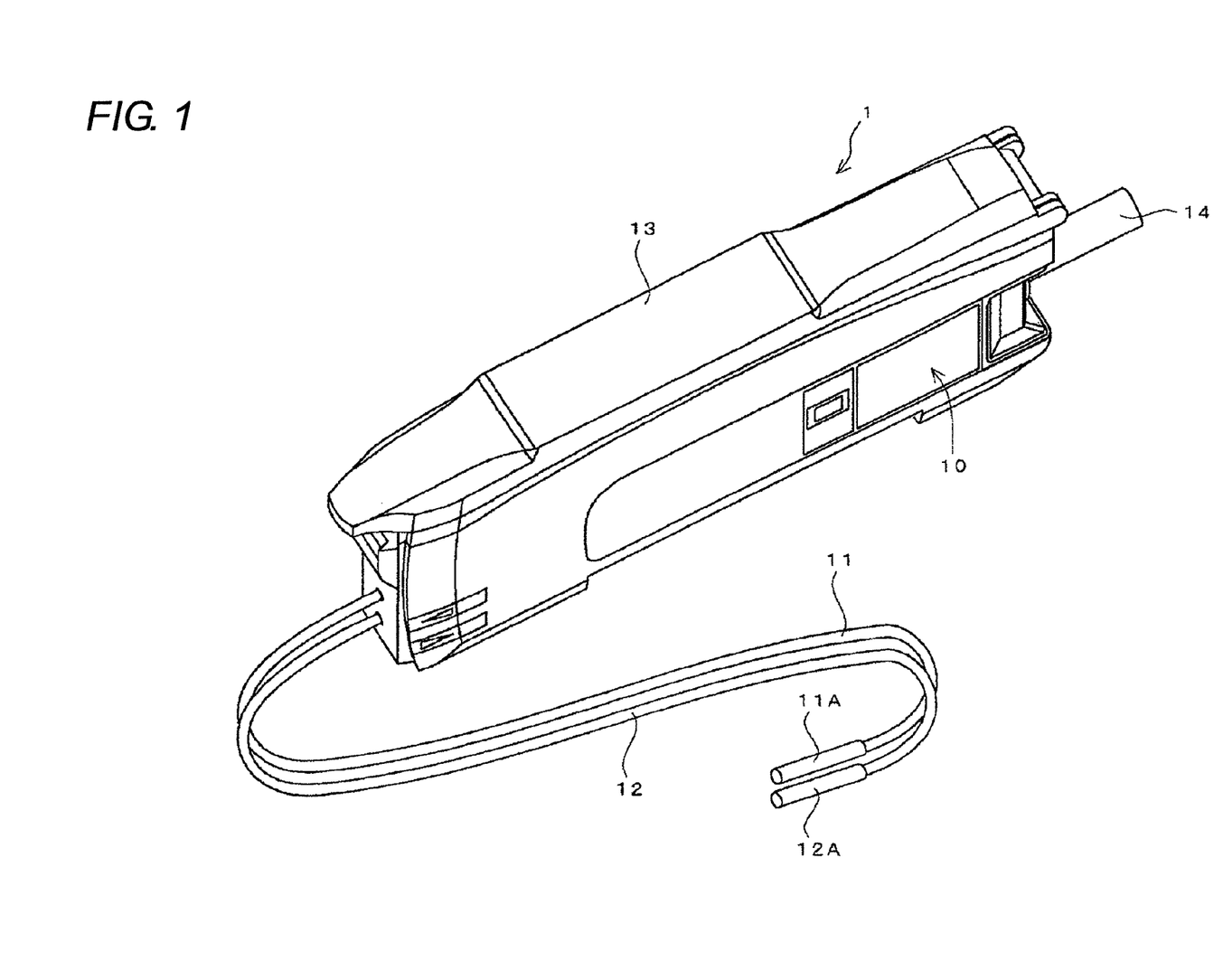
FIG. 1 is a view showing the appearance of an optical fiber type photoelectric sensor that is an embodiment of a photoelectric sensor.
Figure 2:
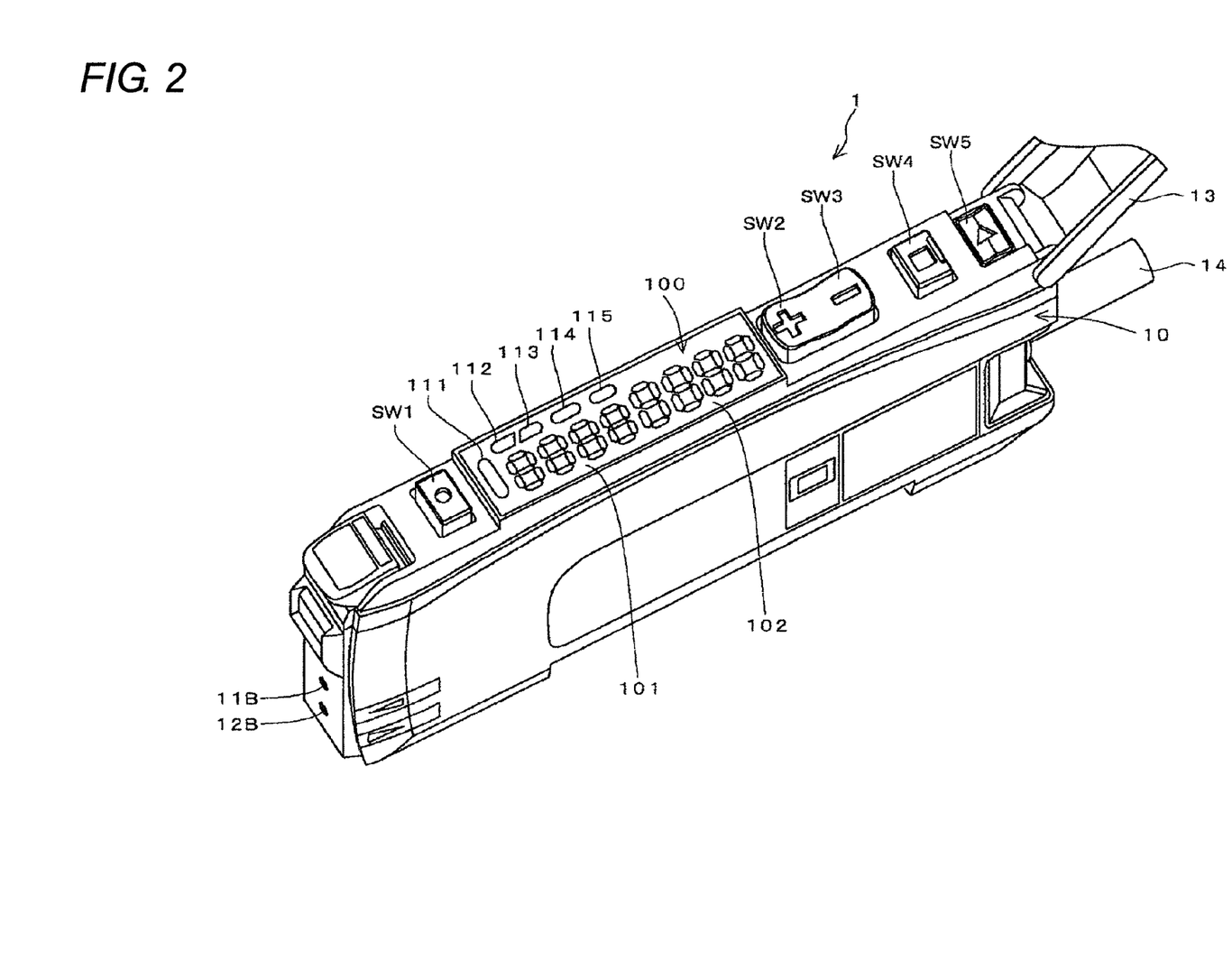
FIG. 2 is a perspective view showing the body in a state where the cover is opened.

FIGS. 1 and 2 are diagrams illustrating the appearance of an optical fiber type photoelectric sensor, which is an embodiment of a photoelectric sensor.

A photoelectric sensor 1 includes a body 10 and a pair of optical fibers 11 and 12 attached to the front of the body 10. One optical fiber 11 is used to emit light and the other optical fiber 12 is used to receive light. The distal ends of the optical fibers 11 and 12 are provided with heads 11A and 12A, respectively, each head including a lens and the like. Actual optical fibers 11 and 12 may be longer than the illustrated form.

The optical fibers 11 and 12 are inserted into insertion slots 11B and 12B on the front of the body 10, respectively. A light emitting unit is disposed near the insertion slot 11B of the emitting optical fiber 11, and a light receiving unit is disposed near the insertion slot 12B of the receiving optical fiber 12. A connection cable 14 is pulled out from the back of the body 10.

The above-described photoelectric sensor 1 functions as a transmission-type sensor where the light receiving unit receives light emitted from the light emitting unit, and which determines a state in which the optical path is blocked as the state of an "object's presence". Alternatively, the photoelectric sensor 1 can also function as a reflection-type photoelectric sensor that receives light reflected from an object and determines the state of an "object's presence". For use as a reflection-type photoelectric sensor, common heads are mounted on the distal ends of the optical fibers 11 and 12, and the heads are arranged toward a detection area.

The amount of received light generated by the light receiving unit is input to a control device (a control unit 105 described below), and it is determined whether the light receiving unit is in a light receiving state by comparison with a threshold that has been registered in advance, the result of which is output.

Figure 3:
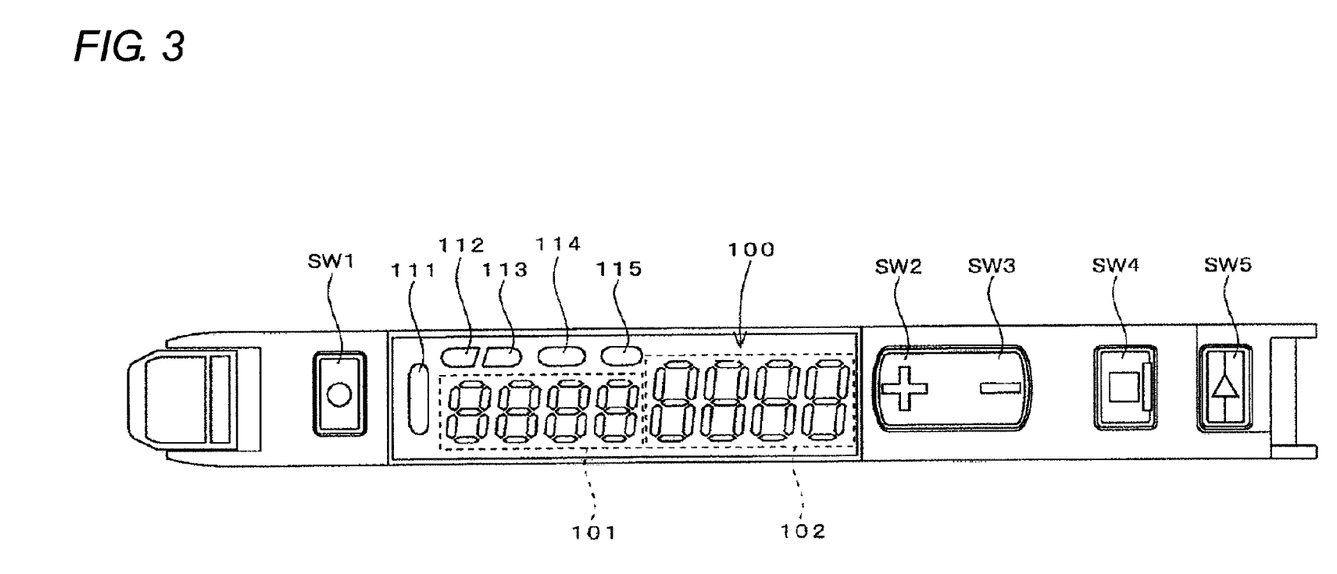
FIG. 3 is a diagram illustrating the upper surface of the photoelectric sensor when viewed from the front.

The upper surface of the body 10 is provided with a display unit 100 and a plurality of push button switches SW1 to SW5. A cover 13 is placed over the upper surface when in use, while the cover 13 is opened, for example, during setting, thereby allowing the push button switches SW1 to SW5 to be operated. FIG. 2 is a perspective view of the body 10 in a state where the cover 13 is opened, and FIG. 3 is a diagram illustrating the upper surface when viewed from the front. Since the cover 13 is transparent, the display contents of the display unit 100 can be checked through the cover 13 even when the cover 13 is attached. The cover 13 is omitted in FIG. 3.

Referring to FIGS. 2 and 3, the configuration of the upper surface of the body 10 is described below.

In the present embodiment, the push button switch SW1 is mounted in a position near the front of the body 10, the display unit 100 is provided behind the push button switch SW1, and four push button switches SW2 to SW5 are mounted further behind the display unit 100. The push buttons of the push button switches SW2 and SW3 are formed integrally, while switch bodies (not shown) in the body 10 are formed separately.

The display unit 100 has a pair of displays 101 and 102, and five indicator lights 111 to 115. Each of the displays 101 and 102 is configured to combine four 7-segment LEDs (Light Emitting Diodes), and displays a number and an alphabetic string up to four digits.

The push button switch SW1 on the front side is used for a tuning process described below, and the push button switch SW1 is hereinafter referred to as a "tuning switch SW1".

A pair of push button switches SW2 and SW3 behind the display unit 100 are used to change numerals and sub-menus displayed on the displays 101 and 102. Hereinafter, the push button switch SW2 with a sign (+) on its push button is referred to as an "up-switch SW2", and the push button switch SW3 with a sign (−) on its push button is referred to as a "down-switch SW3".

The push button switch SW4 is used to switch between a measurement mode and a setting mode, and to select and determine the main menu option of the setting mode. The push button switch SW4 is hereinafter referred to as a "mode switch SW4".

If any has been set in the setting mode, the setting is determined. Switching to the measurement mode using the mode switch SW4 starts to measure based on the setting.

The push button switch SW5 is to switch the output format of the photoelectric sensor 1. Specifically, either a "Light-ON mode" or a "Dark-ON mode" is selected, where the Light-ON mode turns on the output when the amount of received light becomes equal to or greater than a threshold value, while the Dark-ON mode turns on the output when the amount of received light becomes equal to or smaller than the threshold value.

The indicator light 111 is lit when a detection signal from the photoelectric sensor 1 is turned on in a detection process. The indicator light 112 is lit when the Light-ON mode is selected, while the indicator light 113 is lit when the Dark-ON mode is selected.

The indicator light 114 is lit when the process of automatically adjusting the displayed amount of received light is enabled. The indicator light 115 is turned off in initialization, and is continuously lit after completion of tuning.

B. Electrical Configuration of Photoelectric Sensor

Figure 4:
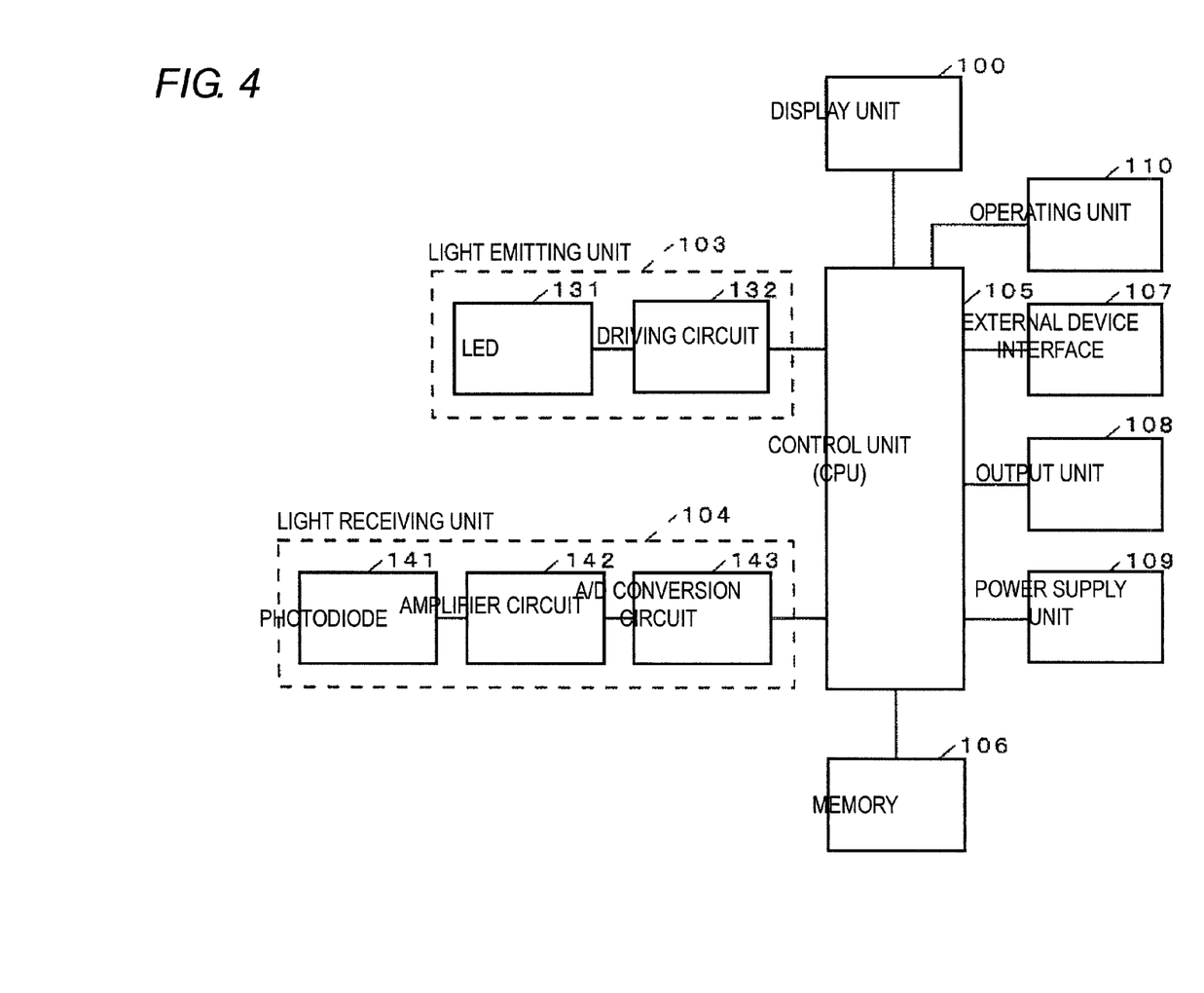
FIG. 4 is a block diagram showing an electrical configuration of the photoelectric sensor.

FIG. 4 is a block diagram showing an electrical configuration of the photoelectric sensor 1 described above.

In the photoelectric sensor 1, a light emitting unit 103 and a light receiving unit 104, as well as a memory 106 for storing programs, a display unit 100, an operating unit 110, an external device interface 107, an output unit 108, a power supply unit 109 and the like, are connected to a control unit 105. The control unit 105 includes a central processing unit (CPU), and executing a predetermined program by the CPU provides the control described herein.

The display unit 100 includes the displays 101, 102 and the indicator lights 111 to 115, and the operating unit 110 includes the push button switches SW1 to SW5. The light emitting unit 103 has an LED 131 and an LED driving circuit 132, and the light receiving unit 104 has a photodiode (PD) 141 as well as an amplifier circuit 142 and an A/D conversion circuit 143. In the light emitting unit 103, a drive current flows from the LED driving circuit 132 to the LED 131, whereby light is emitted. In the light receiving unit 104, the output from the photodiode 141 is processed by the amplifier circuit 142 and the A/D conversion circuit 143, whereby digital data indicating the amount of light received (hereinafter referred to as the "amount data of received light" or a "detection value") is generated.

The control unit 105, which controls the operations of the light emitting unit 103 and the light receiving unit 104 based on a program stored in the memory 106, accepts the amount data of received light from the light receiving unit 104 and performs the detection process. Detection result is output through the output unit 108 and the external device interface 107.

The photoelectric sensor 1 may be provided with a media driver as an interface for the control unit 105 to read data from and to write data to a recording medium. The recording medium is removable from the photoelectric sensor 1. The control unit 105 may execute a program recorded on the recording medium. Such a recording medium is, for example, CD-ROM (Compact Disk-Read Only Memory), DVD-ROM (Digital Versatile Disk-Read Only Memory), USB (Universal Serial Bus) memory, memory card, FD (Flexible Disk), hard disk, magnetic tape, cassette tape, MO (Magnetic Optical Disk), MD (Mini Disk), IC (Integrated Circuit) card (except memory card), optical card, mask ROM, EPROM, or EEPROM (Electronically Erasable Programmable Read Only Memory), which stores programs in a nonvolatile manner.

C. Example of Display in Photoelectric Sensor

The operation mode of the photoelectric sensor 1 involves a measurement mode and a setting mode. The measurement mode is a mode to output the above-described determination result to an external device. The setting mode is a mode to set the operation of the photoelectric sensor 1 in the measurement mode.

Upon operation of the tuning switch SW1 in the measurement mode, a setting process referred to as "tuning" is performed. Tuning performs the processes of setting a threshold and of adjusting sensitivity together, which are essential for the detection process. Simply speaking, in the case where a moving workpiece is detected, the tuning switch SW1 is pressed for a predetermined time or more while moving a workpiece under the same condition as when it is detected, and determines the maximum and minimum values of the amount of light received during that time. The sensitivity is then adjusted such that the maximum value becomes equal to a predetermined target value, the minimum value is corrected according to the adjustment, and the intermediate value between the maximum and minimum values is set as a threshold. Note that the sensitivity is adjusted by adjusting a drive current flowing through the light emitting unit 103 and the magnification of the amplifier circuit 142 of the light receiving unit 104.

The tuning process may be performed by the operation of pressing the tuning switch SW1 twice in a relatively short time interval, in which case one operation is performed in a state where the workpiece is placed in the detection area, and the other operation is performed in a state where the workpiece is not placed in the detection area. The sensitivity is then adjusted such that a larger one of the amounts of light received according to the operations is equal to a target value, the other amount of light received is corrected according to the adjustment, and the intermediate value between the maximum and minimum amounts of light received is set as a threshold.

A predetermined operation (e.g., pressing and holding the tuning switch SW1) in the measurement mode performs "response time setting". Response time means a delay time from the change of a detection state (a light receiving state or a light non-receiving state in the light receiving unit) until the inverse of the output (from ON to OFF, or from OFF to ON).

Figure 5:
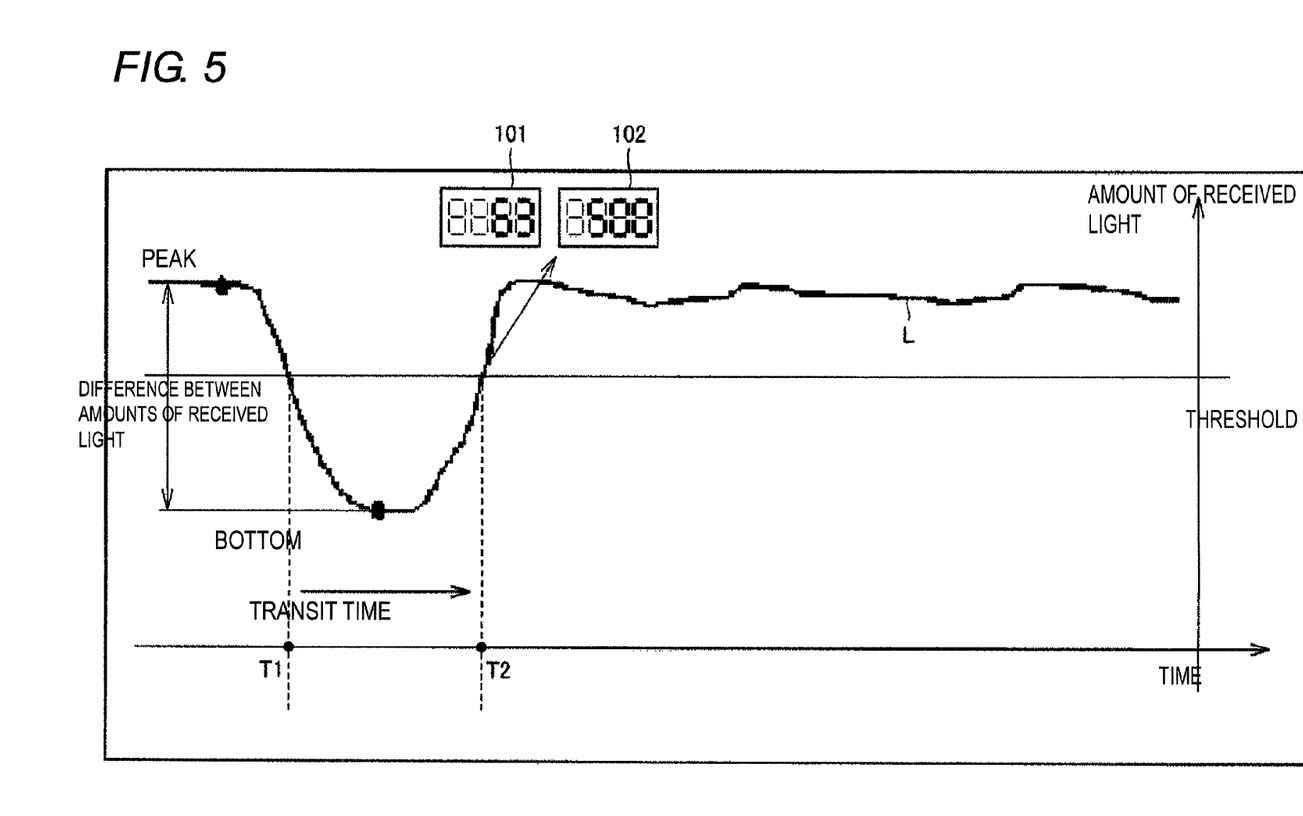
FIG. 5 is a diagram showing the process of setting a response time.

In the response time setting, the control unit 105 measures a time required from when the detection value of the amount of received light varies across a threshold set at that time until when the detection value thereof varies across the threshold again, and displays the time on the display 102. FIG. 5 is a diagram showing the process of setting a response time. Referring to FIG. 5, an overview of the process of setting the response time is described below.

A line L indicates the detection value of the amount of received light in FIG. 5, where the ordinate represents the amount of received light, and the abscissa represents time.

As shown in FIG. 5, after the detection value corresponds to the threshold at time T1, the detection value further decreases, takes a local minimum value, then increases, corresponds to the threshold at time T2, and further rises. In the example of FIG. 5, the time required from when the detection value first varies across the threshold until when the detection value varies across the threshold again is "T2-T1".

FIG. 5 also shows the display content of the display 102. When the detection value crosses the threshold twice as described above, the control unit 105 calculates the time ("T2-T1") from the first crossing of the threshold until the second crossing thereof, and displays it on the display 102. Such a time is referred to as "transit time" herein. In FIG. 5, a numeral "500" is displayed on the display 102 as an example of the transit time.

FIG. 5 also shows the display content of the display 101. As described above, when the detection value crosses the threshold twice, the control unit 105 displays the transit time on the display 102, and, in addition, displays a variation amount to the local minimum value in the detection value on the display 101. The variation amount is shown as "difference between the amounts of received light" in FIG. 5. In the line L, the difference between the amounts of received light is a difference between a detection value indicated by "peak" and a detection value (local minimum value) indicated by "bottom". The control unit 105 obtains the peak, for example, as an inflection point at which a value in the line L starts to decrease. Such a width is referred to as "resolution" herein as needed. In FIG. 5, a numeral "63" is displayed on the display 101 as an example of the resolution.

If a moving workpiece is to be detected, a user causes the photoelectric sensor 1 to perform, for example, the response time setting. The user moves the workpiece under the same conditions as when it is detected to perform the response time setting. The workpiece passes through a detection area causing the detection value to vary across the threshold twice as shown in FIG. 5. When the detection value varies in this manner, the control unit 105 calculates the transit time, and displays the transit time on the display 102, as described above. The user determines whether the settings of the current response time is appropriate by viewing the transit time, and changes the settings of the response time as needed. The settings may be changed by operating switches such as the up-switch SW2 and the down-switch SW3. When a switch such as the up-switch SW2 or the down-switch SW3 is operated while the display 102 displays the transit time, the control unit 105 sequentially designates each of multiple detection functions (see table of FIG. 8F described below), information of which is stored in the photoelectric sensor 1. Thus, when the operation of determining a designated detection function is performed, the control unit 105 returns to a state in which the detection function is determined, the response time setting is ended, and a determination result is output to an external device.

That is, when a predetermined operation such as setting a designated detection function is performed during the response time setting, the control unit 105 ends the response time setting, and performs the operation in a normal measurement mode. While the response time setting is performed in the measurement mode, the control unit 105, preferably, temporarily stops to output the determination result to an external device and resumes outputting the determination result to the external device after ending the response time setting.

Note that, in the photoelectric sensor 1, the amount of light may be changed depending on the response time and the user can change the setting of the response time while viewing not only the transit time but also the resolution.

D. Setting Detection Function Based on Resolution

In the photoelectric sensor 1, the control unit 105 acquires the amount of light received in the light receiving unit, for example, every first-time (e.g., 100µ seconds) in order to obtain detection values indicated by the line L in FIG. 5, where the "first-time" corresponds to the response time. If the response time is longer, the control unit 105 can determine the amount of received light based on more number of detection outputs of the light receiving element. This is because if the response time is longer, time to process more number of detection outputs of the light receiving element is given to the control unit 105. Thus, the longer the response time is, the more the maximum amount (also referred to just as the "amount of light") that can be used for a single determination of the amount of received light increases in the photoelectric sensor 1. Accordingly, if a response time is specified in the photoelectric sensor 1, the amount of light may be limited by the response time in some cases.

The photoelectric sensor 1 stores information in the memory 106 to perform multiple detection functions (response times) as described below. Each of the multiple detection functions includes the response time and the amount of light that are achieved by the detection function.

Figure 6A:
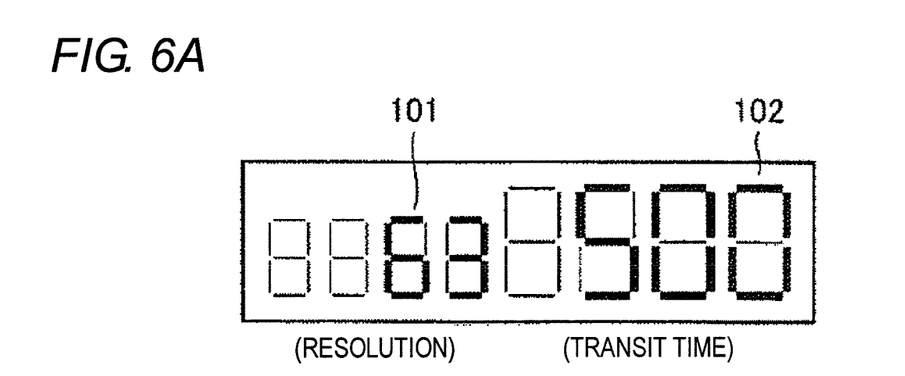
FIGS. 6A-C are diagrams showing an example of the transition of the display contents of displays.
Figure 6B:
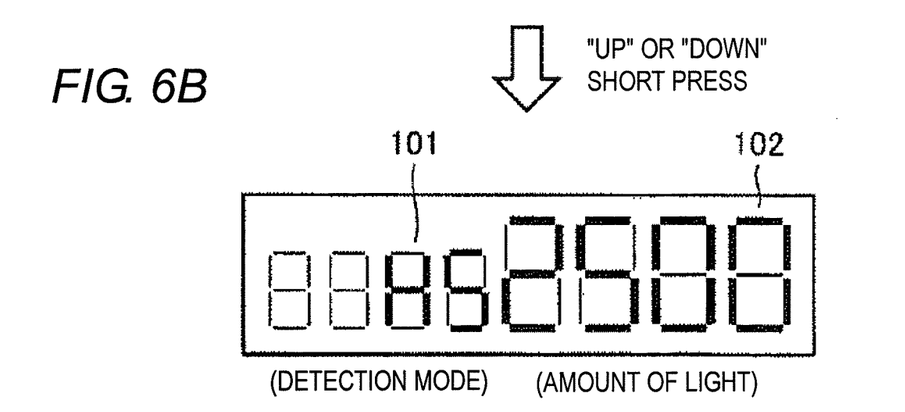
Figure 6C:
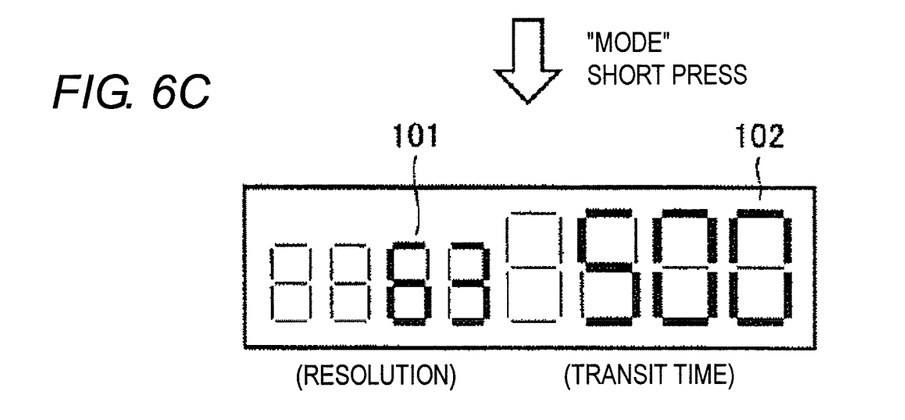

When the response time setting is performed as described above, the user can manually set the response time, or alternatively, the control unit 105 can set the response time according to the transit time. FIG. 6 is a diagram showing an example of the transition of the display contents of the displays 101 and 102. Setting of the response time according to the detected transit time using the control unit 105 is described below with reference to FIG. 6.

FIGS. 6A to 6C show the display contents of the displays 101 and 102.

When the detection value varies across the threshold in the response time setting, resolution and a transit time are displayed on the displays 101 and 102, respectively, as shown in FIG. 6A. As with FIG. 5, FIG. 6A shows a numeral 63 as the resolution and a numeral 500 as the transit time.

The control unit 105 may select, for example, a detection function that has the response time shorter than the transit time detected and has the amount of light greater than the resolution detected, among two or more detection functions stored in the memory 106. A predetermined operation (e.g., a short press of the up-switch SW2 or the down-switch SW3) causes the control unit 105 to display information identifying the selected detection function on the display 101. Here, an example of the display is shown in FIG. 6B.

The control unit 105 may also set the response time based on the detected transit time and resolution regardless of information of the detection functions stored in the memory 106. In this case, the control unit 105 sets, for example, a predetermined ratio of time to the transit time as the response time, where the predetermined ratio is smaller than one. Note that if the amount of received light corresponding to an amount of light corresponding to the response time is smaller than an amount of received light corresponding to the resolution, the control unit 105 changes the response time so as to guarantee the amount of light corresponding to an amount of received light greater than an amount of received light corresponding to the resolution by more than a predetermined value.

The display 101 of FIG. 6B displays information ("HS") identifying a detection function, at which time the control unit 105 causes the display 102 to display, for example, information ("2500") identifying the amount of light achieved by the detection function. The user can check which detection function has been selected by viewing the display content of the display 101 of FIG. 6B. The user also can determine whether the amount of light achieved by the selected detection function is appropriate to detection result of the resolution displayed on the display 101 of FIG. 6A by viewing the display content of the display 102 of FIG. 6B.

In the state shown in FIG. 6B, a further predetermined operation (for example, a short press of the mode switch SW4) causes the control unit 105 to return the display contents of the displays 101 and 102 to the resolution and transit time as shown in FIG. 6C.

E. Flow of Operation of Photoelectric Sensor

Figure 7:
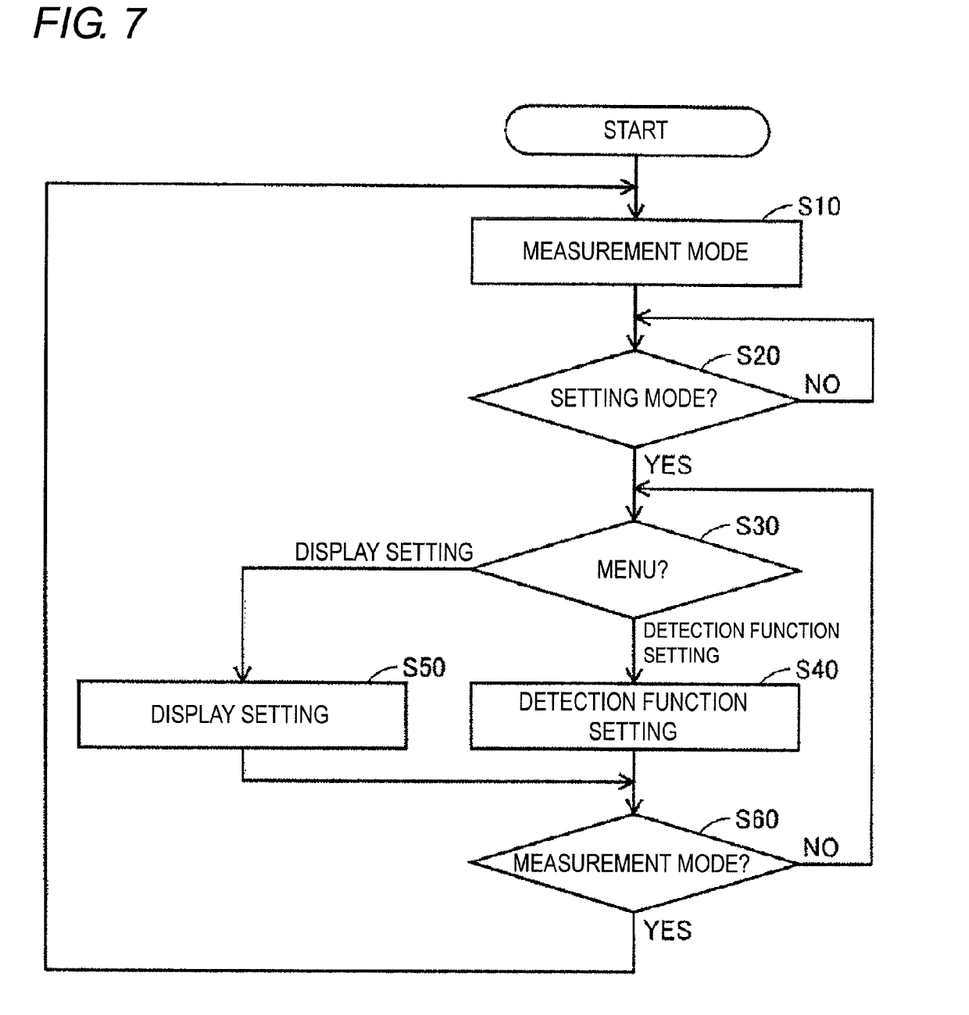
FIG. 7 is a flow chart showing the operation control of the photoelectric sensor.

FIG. 7 is a flow chart showing the operation control of the photoelectric sensor 1. The outline of the operation of the photoelectric sensor 1 is described below with reference to FIG. 7.

Referring to FIG. 7, when the photoelectric sensor 1 is powered on, the control unit 105 performs an initial operation (e.g., check of operations, initial information setting, etc.), and then operates in the measurement mode in step S10. This allows the photoelectric sensor 1 to output the above-described determination result to an external device after the initial operation. If the response time setting is performed in the measurement mode, the output of the determination result to an external device is temporarily stopped.

In step S20, the control unit 105 determines whether the operation of changing the operation mode to the setting mode is performed during the measurement mode. If the control unit 105 determines that the operation of changing the operation mode is not performed, the control unit 105 continues the measurement mode in step S10, and if the control unit 105 determines that the operation of changing the operation mode has been performed, the control unit 105 proceeds to step S30.

In step S30, the control unit 105 accepts a menu selection in the setting mode. The setting mode includes, for example, a detection function setting menu and a display setting menu. In the setting mode of the photoelectric sensor 1, a menu to be performed is selected, for example, by operation of the mode switch SW4. If the control unit 105 determines that the detection function setting menu has been selected, the control unit 105 proceeds to step S40. If the control unit 105 determines that the display setting menu has been selected, the control unit 105 proceeds to step S50.

In step S40, the control unit 105 performs the function setting menu, and proceeds to step S60. In the detection function setting menu, the control unit 105 accepts specifying settings of the detection function. FIG. 8 is a diagram for explaining the process in the detection function setting menu. Referring to FIG. 8, the process in the detection function setting menu is described in more detail below.

Figure 8A:
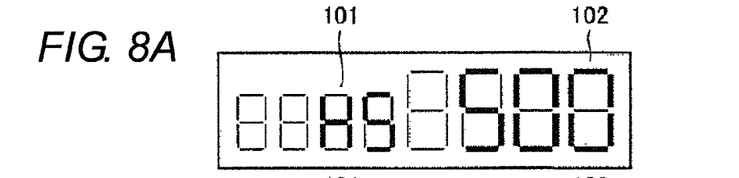
FIGS. 8A-F are diagrams for explaining the process in a detection function setting menu.
Figure 8B:
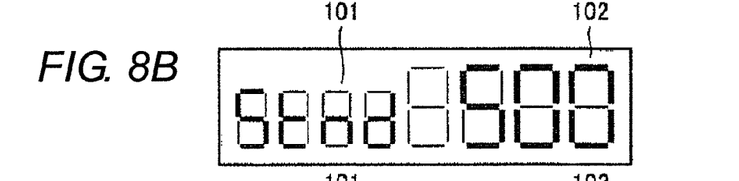
Figure 8C:
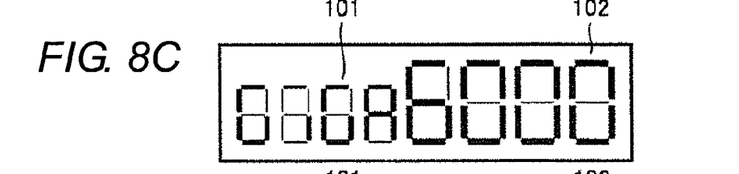
Figure 8D:
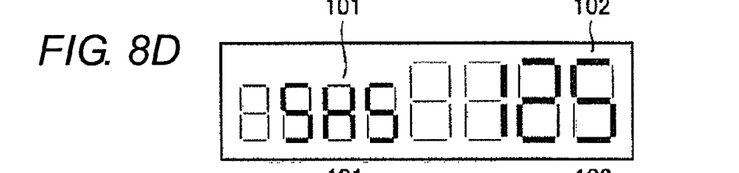
Figure 8E:
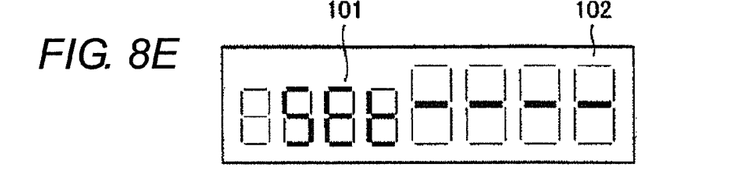
Figure 8F:
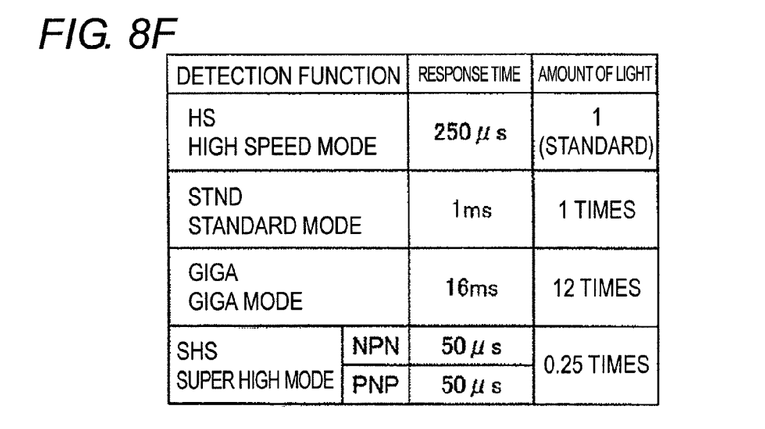

FIGS. 8A to 8E show examples of the display contents of the displays 101 and 102, and FIG. 8F schematically shows an example of information about detection functions stored in the memory 106.

As shown in FIG. 8F, information about four types of detection functions is stored in the photoelectric sensor 1, in which detection functions are "HS: high speed mode", "STND: standard mode", "GIGA: giga mode", and "SHS: super high mode". The response times and the amounts of light associated with the detection functions are shown in the table of FIG. 8F. When any of the detection functions is designated, the control unit 105 performs the detection operation according to settings about the detection function designated, thereby deriving the determination result and outputting the determination result derived to an external device.

For example, when "HS: high speed mode" is specified, the control unit 105 operates the light emitting unit and the light receiving unit in a response time of 250µ seconds and with 1 times the amount of light and detects an object, where "1 times the amount of light" means a standard amount of light predetermined in the photoelectric sensor 1.

When "GIGA: giga mode" is specified, the control unit 105 operates the light emitting unit and the light receiving unit in a response time of 16µ seconds and with 12 times the amount of light and detects an object. Compared with "HS: high speed mode", the response time is 64 times the length in "GIGA: giga mode" and the amount of light is 12 times accordingly. That is, compared with "HS: high speed mode", the response time is longer in "GIGA: giga mode" and the amount of light is more accordingly.

FIGS. 8A to 8D are representations corresponding to the designated detection functions. More specifically, FIGS. 8A, 8B, 8C, and 8D corresponds to "HS: high speed mode", "STND: standard mode", "GIGA: giga mode", and "SHS: super high mode", respectively. In FIGS. 8A to 8D, the displays 101 display strings ("HS", "STND", "GIGA", and "SHS") that indicate the functions, and the displays 102 display the amounts of light ("500", "500", "6000", and "125") corresponding to the functions above.

When the operation of determining the detection function designated in the detection function setting menu is performed, the settings of the detection function is updated in the photoelectric sensor 1. The control unit 105 detects an object based on the settings of the detection function in the measurement mode.

In the detection function setting menu, for example, each time the mode switch SW4 is operated, the mode to be specified is changed in the order shown in the table of FIG. 8F.

Note that the detection function setting menu allows the response time to be set while referring to the obtained transit time as described with reference to FIG. 5. More specifically, for example, if the mode switch SW4 is further operated in a state where "SHS: super high mode" is specified, the control unit 105 switches the display of the displays 101 and 102 as shown in FIG. 8E.

In FIG. 8E, the display 101 displays a string "SEt" (meaning "SET"), and the display 102 displays "- - -". Thus, a state is indicated in which the photoelectric sensor 1 measures the transit time etc. described with reference to FIG. 5. When the transit time etc. are obtained in such a manner described with reference to FIG. 5, the display 102 displays the transit time obtained. The display 101 also displays the resolution. Based upon viewing of these values, a user can select and designate a detection function to be used for detection from the detection functions shown in FIG. 8F.

Returning to FIG. 7, when an operation to exit the function setting menu is performed while the function setting menu is running in step S40, the control unit 105 proceeds to step S60.

Alternatively, in step S50, the control unit 105 performs the display setting menu, which is to set the content for display on the display 102 in the measurement mode. Display options to be set are, for example, as follows: 1) threshold, 2) minimum peak value of incident light, 3) ratio of detection value to threshold, 4) amount of received light at peak level, 5) channel number to connect, and 6) transit time.

FIGS. 9A to 9F show the display contents of the displays 101 and 102 when the options are specified. The display contents of FIGS. 9A to 9F correspond to the above options 1) to 6), respectively. The selection in the display setting menu is switched in the order of the options 1) to 6), for example, each time the mode switch SW4 is operated.

In all of FIGS. 9A-9F, the display 101 displays a string "disp" (corresponding to "display") indicating that the display content is selected.

Figure 9A:
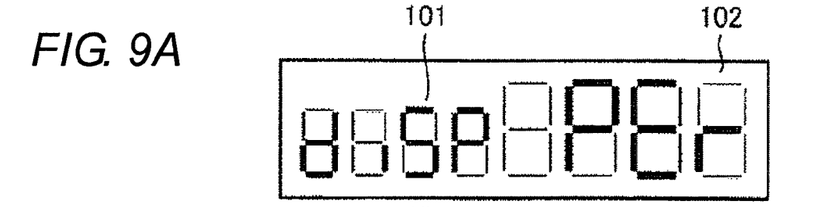
FIGS. 9A-F are diagrams showing examples of the display contents of the displays in a display setting menu.
Figure 10A:
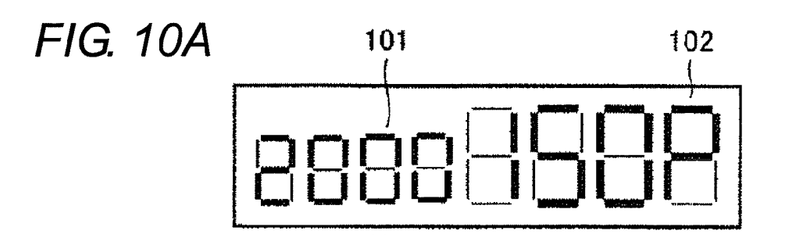
FIGS. 10A-F are diagrams showing examples of the display contents of the displays in a measurement mode.

The display 102 of FIG. 9A displays a string "PEt" indicative of the setting option 1) "threshold". When this setting option has been determined, the measurement mode displays a threshold on the display 101 and a ratio of the amount of received light (a ratio of the maximum or minimum value of the detection value of the amount of received light to a threshold) on the display 102, for example, as shown in FIG. 10A.

Figure 9B:
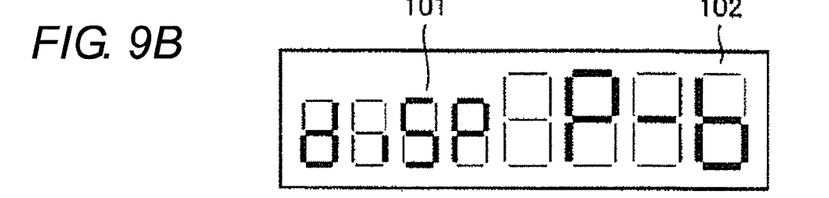
Figure 10B:
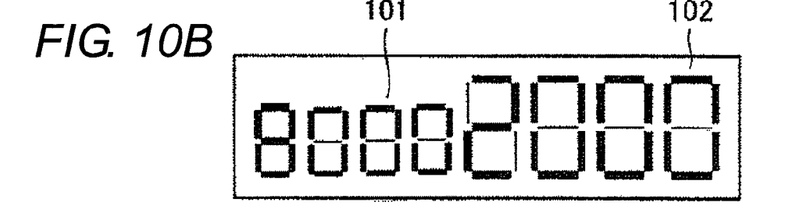

The display 102 of FIG. 9B displays a string "P-b" indicative of the setting option 2) "minimum peak value of incident light". When this setting option has been determined, the measurement mode displays the peak amount of received light on the display 101 and the bottom amount of received light on the display 102, for example, as shown in FIG. 10B, where the peak amount of received light and the bottom amount of received light are, for example, the maximum and minimum values in the detection values in a certain period of time including the extreme values when extreme values (maximum and minimum values) of the detection values have been obtained, respectively.

Figure 9C:
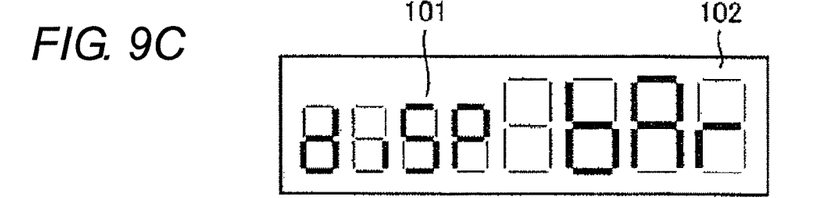
Figure 10C:
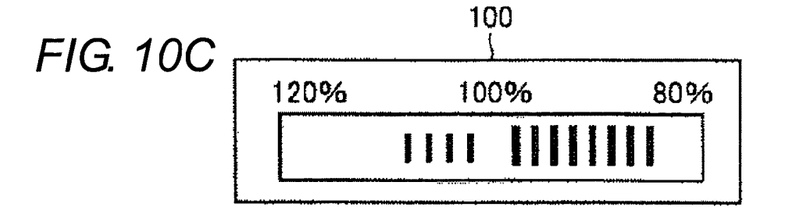

The display 102 of FIG. 9C displays a string "bAr" indicative of the setting option 3) "ratio of detection value to threshold". When this setting option has been determined, the measurement mode displays a ratio to which the current amount of received light corresponds, based upon the threshold taken as 100%, on the display unit 100 as shown in FIG. 10C, for example.

Figure 9D:
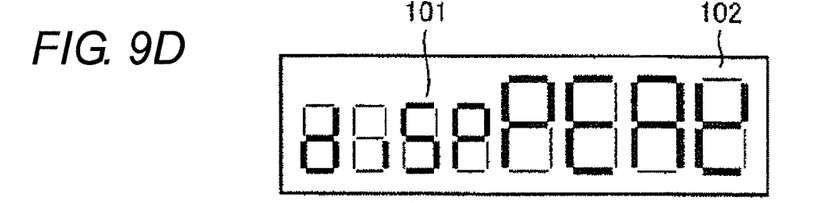
Figure 10D:
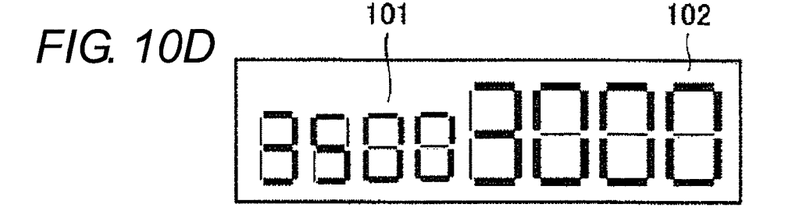

The display 102 of FIG. 9D displays a string "PEAK" indicative of the setting option 4) "amount of received light at peak level". When this setting option has been determined, the measurement mode displays the peak amount of received light on the display 101 and the current amount of received light on the display 102, for example, as shown in FIG. 10D. The peak amount of received light is the extreme value when an extreme value of the detection values has been obtained.

Figure 9E:
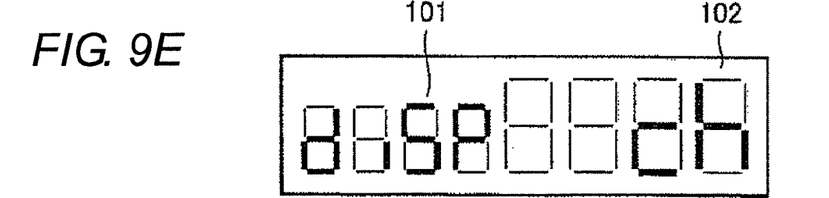
Figure 10E:
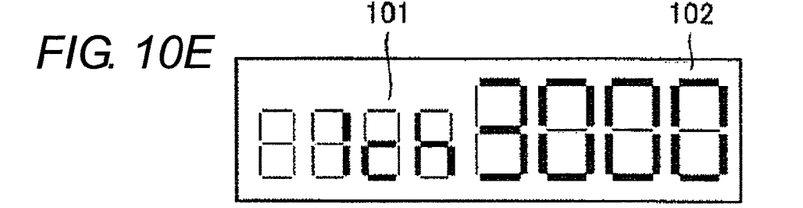

The display 102 of FIG. 9E displays a string "ch" indicative of the setting option 5) "channel number to connect". When this setting option has been determined, the measurement mode displays a channel number on the display 101 and the current amount of received light on the display 102, for example, as shown in FIG. 10E. The channel number is the number of the channel to which the photoelectric sensor 1 outputs the determination result.

Figure 9F:
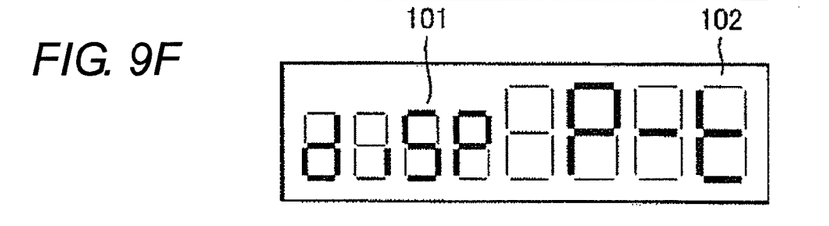
Figure 10F:
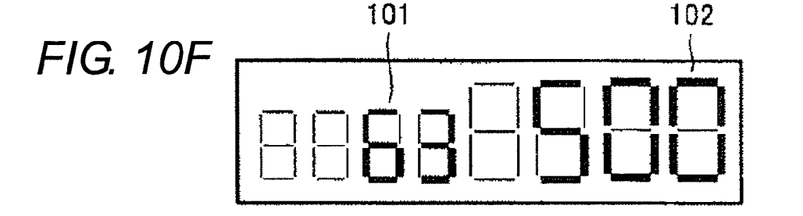

The display 102 of FIG. 9F displays a string "P-t" indicative of the setting option 6) "transit time". When this setting option has been determined, the measurement mode displays resolution on the display 101 and a transit time on the display 102, for example, as shown in FIG. 10F. The control unit 105 obtains the resolution and the transit time, for example, in the method referring to FIG. 5.

Returning to FIG. 7, when an operation to exit the display setting menu is performed while the display setting menu is running in step S50, the control unit 105 proceeds to step S60.

In step S60, the control unit 105 determines whether the operation of entering the measurement mode is performed in the photoelectric sensor 1. If the control unit 105 determines that such an operation is performed, the control unit 105 returns to step S10. Alternatively, if the control unit 105 determines that any other operation is performed, the control unit 105 proceeds to step S30.

F. Effect of Embodiments

In the present embodiments described above, the photoelectric sensor 1 displays a transit time and resolution by the appropriate operation in the measurement mode, for example, as described with reference to FIG. 5, in which state the photoelectric sensor 1 accepts specifying the settings of the response time. This allows a user to view measurement values of the transit time and the resolution and to set a response time based on the measurement values.

The photoelectric sensor 1 displays measurement values of a transit time and resolution also in the setting mode, for example, as described with reference to FIG. 8. This allows a user to view measurement values of the transit time and the resolution and to set a response time based on the measurement values, also in the setting mode.

Note that such a display of the measurement value of the transit time in the photoelectric sensor 1 only has to be provided in at least one of the measurement mode and the setting mode.

When the photoelectric sensor 1 obtains the transit time, the lighting manner of indicators such as the indicator light 111 etc. may be linked to or may not be linked to the crossing of a detection value through the threshold (i.e., time T1 and/or time T2 in FIG. 5). The control unit 105 may turn on the indicator light 111, for example, from when the detection value crosses a threshold in one direction until it crosses the threshold in the opposite direction (i.e., from time T1 to time T2 in FIG. 5). The control unit 105 may use indicators such as the indicator light 111 etc. to display items other than the detection operation while detecting the transit time etc. described with reference to FIG. 5.

It should be understood that embodiments described herein and modifications thereof are merely exemplary in all respects and are not limited thereto. The scope of the present invention is defined by the appended claims and not by the description above, and is intended to cover all modifications within the meaning and the scope equivalent to the claims.

What is claimed is:

1. A photoelectric sensor comprising:
    a light emitting device comprising a light emitter configured to emit detection light toward a detection area;
    a light receiving device comprising a light receiver configured to receive the detection light from the detection area, and the light receiving device obtaining a detection value corresponding to the amount of the light received; and
    a display configured to display information about the detection value in the light receiving device, wherein
    when the detection value varies across a predetermined threshold, the display displays a numerical transit time that is the time from when the detection value crosses the predetermined threshold until when it crosses the predetermined threshold again, and a numerical variation amount of the detection value in the variation.

2. The photoelectric sensor according to claim 1, wherein the display displays only numerical values and alphabetic strings.

3. The photoelectric sensor according to claim 2, wherein the display comprises a pair of displays.

4. The photoelectric sensor according to claim 3, wherein the pair of displays simultaneously display the transit time and the variation amount of the detection value.

* * * * *